United States Patent
Merchan

(10) Patent No.: US 10,102,414 B2
(45) Date of Patent: Oct. 16, 2018

(54) PACKAGING STRUCTURED FOR AUTHENTICATION AND MEASUREMENT

(71) Applicant: Robert Bosch GmbH, Stuttgart (DE)

(72) Inventor: Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 15/267,456

(22) Filed: Sep. 16, 2016

(65) Prior Publication Data

US 2017/0083737 A1 Mar. 23, 2017

Related U.S. Application Data

(60) Provisional application No. 62/221,151, filed on Sep. 21, 2015.

(51) Int. Cl.
| | | |
|---|---|---|
| *G06K 7/10* | (2006.01) | |
| *G06K 9/00* | (2006.01) | |
| *B65D 5/42* | (2006.01) | |

(52) U.S. Cl.
CPC .......... *G06K 9/0004* (2013.01); *B65D 5/4212* (2013.01); *B65D 5/4225* (2013.01); *G06K 9/00087* (2013.01); *G06K 9/00577* (2013.01); *B65D 2203/00* (2013.01); *G06K 2009/0059* (2013.01)

(58) Field of Classification Search
CPC ............ G06K 9/0004; G06K 9/00087; G06K 9/00577; G06K 2009/0059; B65D 5/4212; B65D 5/4225; B65D 2203/00
USPC .......................................... 235/454; 345/173
See application file for complete search history.

(56) References Cited

U.S. PATENT DOCUMENTS

| | | | |
|---|---|---|---|
| 2,409,736 A | 10/1946 | Caimi | |
| 3,591,069 A | 7/1971 | Heller | |
| 5,927,495 A | 7/1999 | Didiano, Jr. | |
| 2003/0112423 A1 | 6/2003 | Vig et al. | |
| 2011/0135160 A1 | 6/2011 | Sagan et al. | |
| 2012/0242610 A1* | 9/2012 | Yasumatsu | G06F 3/045 345/173 |
| 2015/0369529 A1* | 12/2015 | Monroe | F25D 3/08 62/457.2 |

FOREIGN PATENT DOCUMENTS

| | | |
|---|---|---|
| WO | 2009127736 A1 | 10/2009 |
| WO | 2012177845 A2 | 12/2012 |
| WO | 2015047977 A1 | 4/2015 |

OTHER PUBLICATIONS

International Search Report corresponding to PCT Application No. PCT/EP2016/072295 (5 pages).
Metois et al., Fiber Fingerprint Identification, AutoID'02 conference, Mar. 2002, 8 pages.

* cited by examiner

*Primary Examiner* — Karl D Frech
(74) *Attorney, Agent, or Firm* — Maginot Moore & Beck LLP

(57) ABSTRACT

A package includes a fingerprint panel having a fingerprint area configured for a diffuse transmission of light. An illumination side of the fingerprint area is configured to be directly illuminated with light from a light source. An opposite imaging side of the fingerprint area is configured to be directly imaged with an imaging device. The fingerprint area includes features that represent an identity of the package.

20 Claims, 9 Drawing Sheets

PACKAGING STRUCTURED FOR AUTHENTICATION AND MEASUREMENT

This application claims the benefit of priority of U.S. provisional application Ser. No. 62/221,151, filed on Sep. 21, 2015, the disclosure of which is herein incorporated by reference in its entirety.

FIELD

This disclosure relates generally to systems and methods for package authentication and particularly to a package having a structure that is optimized for authentication.

BACKGROUND

Various conventional methods are utilized to trade goods. There are, however, individuals and entities that circumvent such methods by producing counterfeit goods. In particular, the counterfeiting of packaged goods such as pharmaceuticals, food products, electronic devices and media, clothing, tobacco products, and the like is a continual problem that is much more relevant today than in any other time in the past. Counterfeiters are constantly increasing the production of such items and are becoming more sophisticated, particularly considering the recent improvements in technologies such as color printing, copying, and scanning. In light of the financial impact of counterfeiting, individuals and business entities have a desire for improved ways to authenticate exchanged goods.

There are numerous systems and techniques for authenticating a packaged good. At a basic level, authentication includes an authorized party assigning an identity to a package and an end user verifying the identity of the package. Some methods of assigning an identity to a package are based on unique and non-clonable properties of the package, such as the randomness of ink splatters made by a printer and the configuration of wood fibers in a paper portion of the package. Problematically, the typical package is not well-suited for this type of authentication, because the structure of the typical package prevents the unique and non-clonable properties of the package from being conveniently and accurately imaged.

FIG. 1 illustrates an exemplary prior art system 10 including a packaged good 14 and an authentication assembly 18. The packaged good 14 includes a product 22 (shown in broken lines) sealed within a package 26. Hidden edges of the package 26 are also shown in broken lines. The package 26 is made at least partially from translucent paper. The authentication assembly 18 includes a light source 30, a digital camera 34, and a controller 38. The light source 30 illuminates the package 26, and the camera 34 images a portion 42 of the package 26. The controller 38 processes image data generated by the camera 34 and generates an identification code based on a configuration of fibers in the imaged portion 42 of the package 26. The identification code represents the identity of the package 26 and is used by an end user or intermediary to authenticate the packaged good 14.

The prior art packaged good 14 is not well-suited for use with the authentication assembly 18. The light emitted by the light source 30 passes through a translucent lower side 46 of the package 26 before illuminating a translucent upper side 50 of the package 26, which includes the imaged portion 42. The intensity of the light emitted by the light source 30 is substantially reduced after passing through the lower side 46 of the package 26, such that the imaged portion 42 of the package 26 is poorly illuminated at best. Moreover, the product 22 which is positioned within the package 26 partially blocks the light emitted by the light source 30. These factors, as well as others, prevent the camera 34 from effectively imaging the portion 42, thereby preventing the authentication assembly 18 from both efficiently generating the identification code and verifying the identity of the packaged good 14.

Based on the above, the typical packaged good is not easily compatible with known authentication assemblies; therefore, improvements to packages are desirable.

SUMMARY

According to an exemplary embodiment of the disclosure, a package includes a fingerprint panel having a fingerprint area configured for a diffuse transmission of light. An illumination side of the fingerprint area is configured to be directly illuminated with light from a light source. An opposite imaging side of the fingerprint area is configured to be directly imaged with an imaging device. The fingerprint area includes features that represent an identity of the package.

According to another exemplary embodiment of the disclosure, a package authentication system includes a package, a light source, and an imaging device. The package includes a plurality of storage space panels and a fingerprint panel. The fingerprint panel includes a fingerprint area configured for diffuse transmission of light and defines an illumination side and an opposite imaging side. The light source is configured to directly illuminate the illumination side. The imaging device is configured to directly image the imaging side. The fingerprint area is configured to be located between the imaging device and the light source during illumination of the illumination side and imaging of the imaging side. The fingerprint area includes features that represent an identity of the package.

BRIEF DESCRIPTION OF THE DRAWINGS

The above-described features and advantages, as well as others, should become more readily apparent to those of ordinary skill in the art by reference to the following detailed description and the accompanying figures in which.

DETAILED DESCRIPTION

Figure 1:
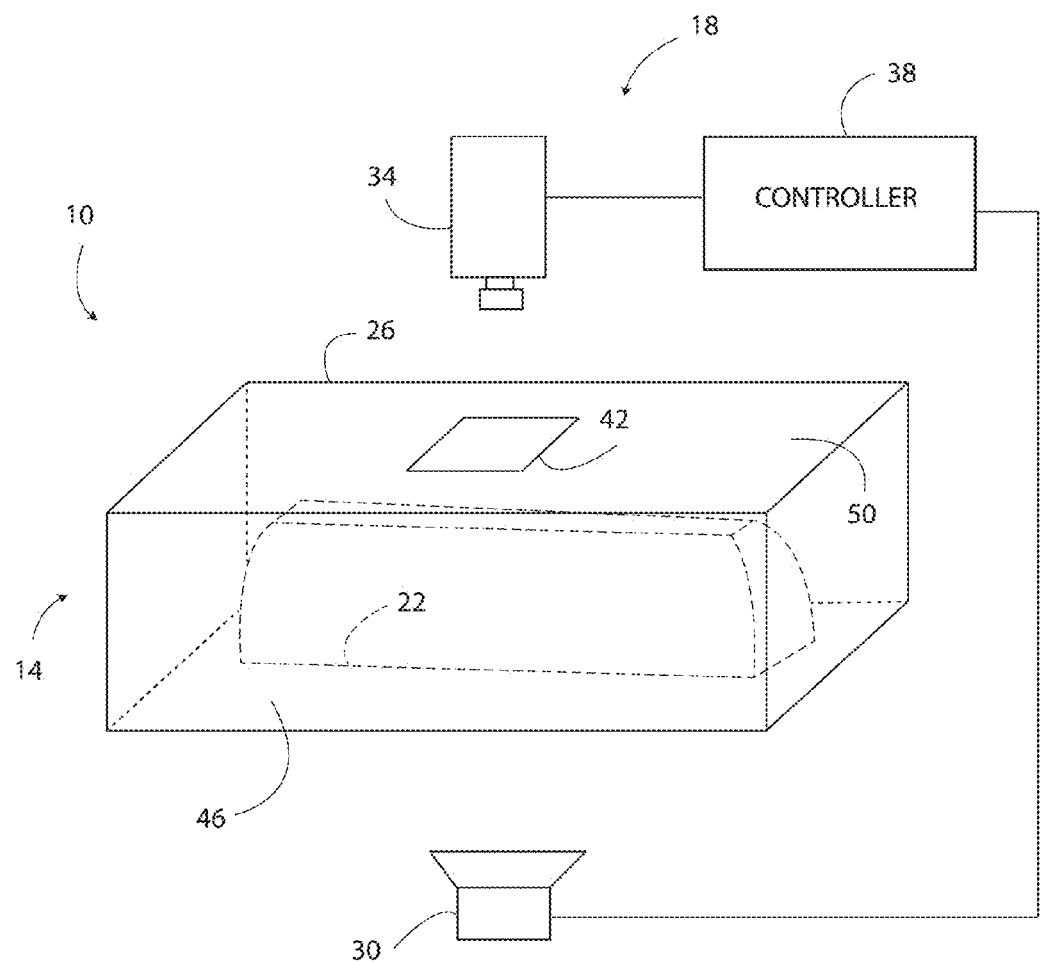
FIG. 1 is a block diagram of a prior art system including a packaged good and an authentication assembly, a product sealed within the package and hidden edges of the package are illustrated in broken lines.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Aspects of the disclosure are disclosed in the accompanying description. Alternate embodiments of the disclosure and their equivalents may be devised without parting from the spirit or scope of the disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B, and C).

The terms "comprising," "including," "having," and the like, as used with respect to embodiments of the disclosure, are synonymous.

Figure 2:
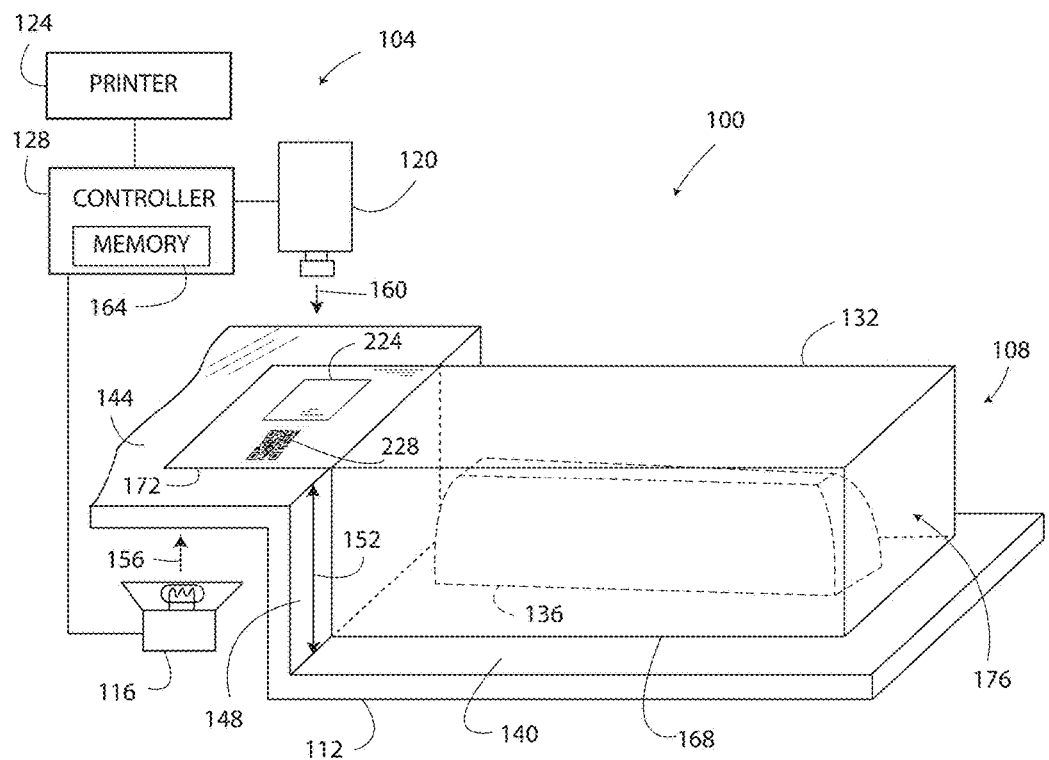
FIG. 2 is a block diagram of a system, as disclosed herein, that includes a packaged good and an authentication apparatus, the packaged good includes a package having an extension flap, shown in an extended position, that is directly illuminated by a light source of the authentication apparatus, a product sealed within the package and hidden edges of the package are illustrated in broken lines.

As shown in FIG. 2, a system 100 includes an authentication apparatus 104 and a packaged good 108. The authentication apparatus 104 includes a support structure 112, a light source 116, an imaging device 120, a printer 124, and a controller 128. The packaged good 108 includes a package 132 and a product 136 sealed therein. The authentication apparatus 104 is used to assign an identity to the packaged good 108 (i.e. to identify the packaged good) as well as to verify the identity assigned to the packaged good 108.

The support structure 112 is configured to support the packaged good 108 during identification and verification of the packaged good 108. The support structure 112 includes a lower platform 140 and an upper platform 144 that are joined by a wall portion 148. In the illustrated embodiment, the lower platform 140 and the upper platform 144 are substantially parallel, and the wall portion 148 is substantially perpendicular to the platforms 140, 144. In other embodiments, the lower platform 140 is not parallel to the upper platform 144. The wall portion 148 defines a height 152 that extends from the lower platform 140 to the upper platform 144. The upper platform 144 is formed at least partially from a transparent material such as glass or acrylic; accordingly, light passes through the upper platform 144 without being scattered or reduced in intensity to any significant extent. In some embodiments, an opening (not shown) is formed in the upper platform 144 to allow light to pass therethrough. The wall portion 148 and the lower platform 140 are formed from any material that is sufficiently rigid or supportive enough to support the packaged good 108.

The light source 116 is configured to emit light through the upper platform 144 of the support structure 112 toward the imaging device 120 in an emitted light direction 156. The light direction 156 is also referred to herein as a light path. The light source 116 is operably connected to the controller 128 with either a wired or wireless electronic connection. In one embodiment, the light source 116 is supported by the wall portion 148; however, in other embodiments the light source 116 is self-supported or is supported by the upper platform 144. The light source 116 is configurable, with the controller 128, to output a desired intensity of light and includes any desired light emitting element, such as an incandescent bulb or a light emitting diode ("LED").

The imaging device 120 is operably connected to the controller 128 and is typically located opposite of the light source 116 and above the upper platform 144 of the support structure 112. Therefore, the imaging device 120 is configured to image an object positioned on the upper platform 144 that is illuminated from below by the light source 116. The imaging device 120 defines an imaging path 160 that is at least partially aligned with the emitted light direction 156. In some embodiments, the imaging path 160 is defined in part by one or more reflective surfaces (e.g. mirrors, not shown). The imaging device 120 is configured to generate digital image data and is typically provided as a digital camera. The imaging device 120 is connected to the controller 128 with either a wired or wireless connection.

The printer 124 is operably connected to the controller 128 and is configured to print graphics, text, or other images on print media, such as the package 132. The printer 124 is typically provided as a laser printer or an inkjet printer, but in other embodiments is provided as any other desired type of printing apparatus. The printer 124 is connected to the controller 128 with either a wired or wireless connection.

The controller 128 is configured to control the light source 116, the imaging device 120, and the printer 124 according to program instructions stored in an electronic memory 164 of the controller 128. The memory 164 is also referred to herein as a non-transient computer readable medium. Additionally, the controller 128 is configured to process the image data generated by the imaging device 120 to determine an identification code that corresponds to unique features of the packaged good 108 and represents an identity of the packaged good 108 and/or the package 132. Moreover, the controller 128 is configured to generate a signature code using a digital security key stored in the memory 164. The controller 128 is provided as a smartphone, a tablet computer, a laptop computer, a desktop computer, or any other type of computing device.

Figure 3:
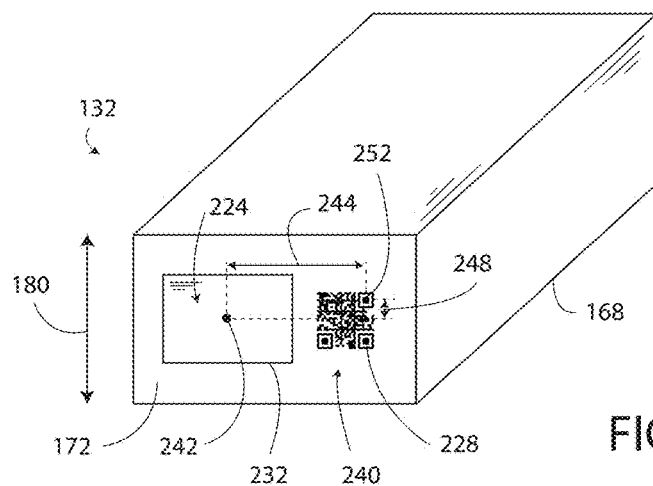
FIG. 3 is a perspective view of the package of FIG. 2 showing a fingerprint area and an indicium of the package, the extension flap is shown in a retracted position.

The package 132 includes a storage section 168 and an extension flap 172. The storage section 168 defines a substantially rectangular cuboid storage space 176 in which the product 136 is positioned. In FIGS. 2 and 3, the storage section 168 is shown in a sealed configuration configured to prevent the product 136 from being removed from the space 176 without destroying at least a portion of the storage section 168, such as by tearing or cutting. An exemplary space 176 defines a volume of approximately 200 cm³ to 1000 cm³ and a height 180 (FIG. 3) that is substantially equal to the height 152 (FIG. 2) of the wall portion 148. In other embodiments, the storage section 168 defines a closed space 176 of any desired shape and size.

The extension flap 172 extends from the storage section 168 and is pivotably positionable in an extended position (FIG. 2) and a retracted position (FIG. 3). As illustrated, in the extended position the extension flap 172 is positioned at about 90° from the wall portion 148. In other embodiments, the extension flap 172 is in the extended position when positioned at an angle ranging from 45° to 135° from the package 132. The extension flap 172 is movable to and from the extended and retracted positions repeatedly without unsealing the storage section 168 or otherwise damaging the package 132. In the illustrated embodiment, the package 132 is formed from a translucent fibrous medium (such as paper) and the extension flap 172 extends from a panel of the storage section 168. Accordingly, the extension flap 172 is configured for the diffuse transmission of light, typically from the light source 116. In another embodiment, the extension flap 172 is formed from a fibrous medium separately from the storage section 168 and is connected to the storage section 168, which is formed from a different fibrous or non-fibrous medium/material. In yet another embodiment, the package 132 is formed from a non-fibrous medium and the extension flap 172 includes a fibrous medium portion permanently connected thereto.

Figure 4:
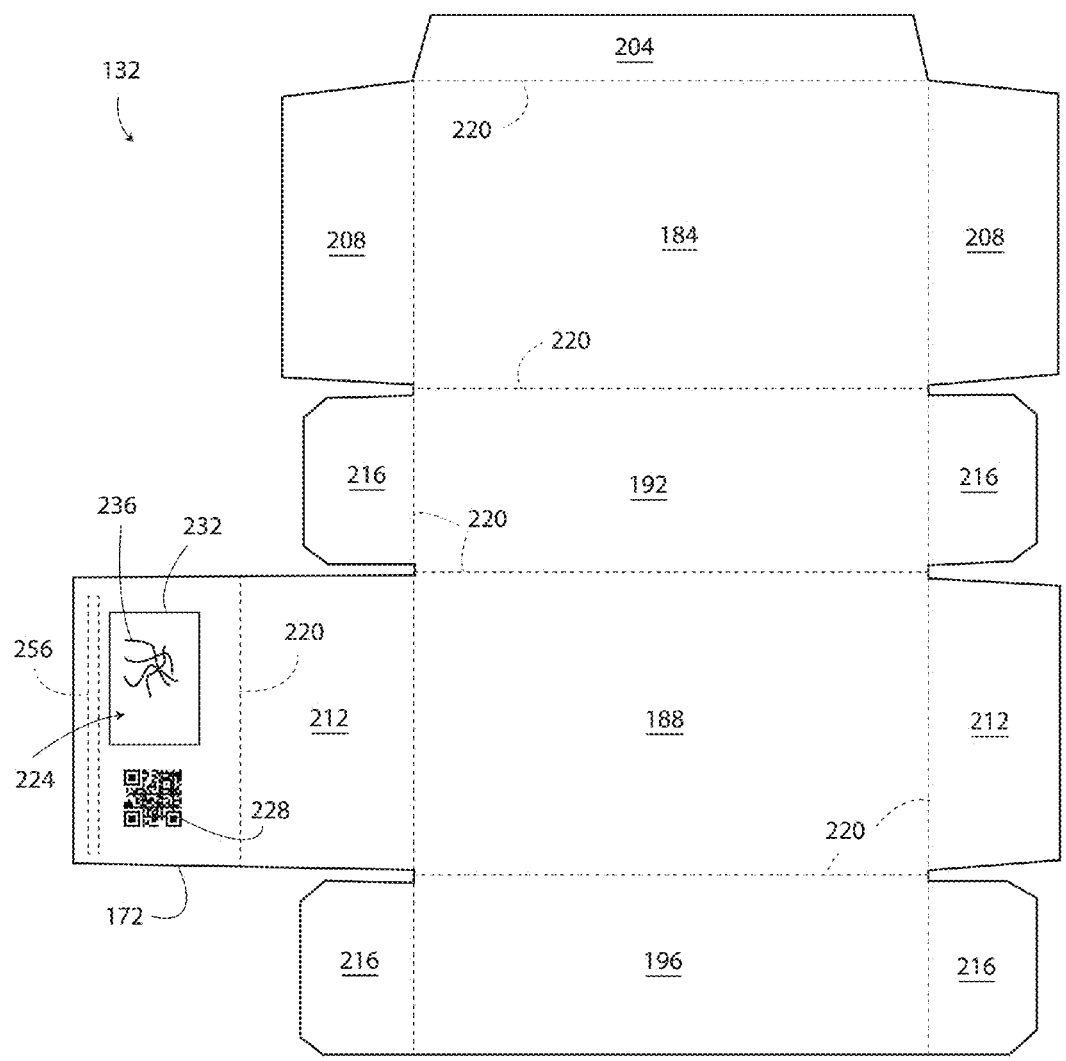
FIG. 4 is a top plan view of the package of FIG. 2 in an unassembled configuration, an adhesive area of the extension flap and fold lines of the package are shown in broken lines.

FIG. 4 illustrates the package 132 in an unassembled state. The package 132 includes a top surface 184, a bottom surface 188, a first side surface 192, and a second side surface 196. The package 132 also includes a longitudinal tab 204, two top tabs 208, two bottom tabs 212, and four side tabs 216. The top surface 184, the bottom surface 188, the side surfaces 192, 196, and the tabs 204, 208, 212, 216 are also referred to herein as storage space panels, because these surfaces define the storage space 176. The extension flap 172 is referred to as a fingerprint panel because the extension flap 172 includes the fingerprint area 224. The storage space panels of the package 132 that do not contain the fingerprint area 224 are not considered to be fingerprint panels. In the illustrated embodiment, the extension flap 172 extends from one of the bottom tabs 212. In the embodiment of FIG. 2, the fingerprint panel does not define the storage space 176. In other embodiments, the extension flap 172 extends from any one of the tabs 208, 212, 216 or the surfaces 184, 188, 192, 196. The package 132 is bent along bend lines 220 to form the storage section 168 (FIGS. 2 and 3). The tabs 208, 212, 216 are bent and at least some of the tabs 208, 212, 216 are sealed together to seal the product 136 within the formed storage space 176. The extension flap 172 is not configured to close or seal the storage space 176; instead, the extension flap 172 is independent of any portion of the package 132 that seals the storage section 168 or defines the storage section 168. In another embodiment, the package 132 is sealed according to any desired package sealing process.

With reference again to FIGS. 3 and 4, the extension flap 172 includes a fingerprint area 224 and an indicium 228. The fingerprint area 224 includes at least a portion of the extension flap 172 that is selected for use by the authentication apparatus 104 to assign the identity to the packaged good 108 and to verify the identity of the packaged good 108. In one embodiment, the fingerprint area 224 is not identified by any human-readable identifier. In other embodiments, the fingerprint area 224 includes a human-readable border 232, which indicates that the fingerprint area 224 is the area of the extension flap 172 located within the border 232.

At least the fingerprint area 224 of the extension flap 172 is formed from a translucent fibrous medium or media that is configured for the diffuse transmission of light, typically from the light source 116. As used herein and with reference to FIG. 4, the term "fibrous medium" includes media having features 236 embedded therein in a substantially random or inhomogeneous arrangement that can be imaged by the imaging device 120. The unique arrangement of the features 236 corresponds somewhat to the unique arrangement of friction ridges on a human fingertip, thereby resulting in the name of the "fingerprint area" 224. Exemplary, fibrous media include paper formed from wood-pulp products, paper formed from any other fibrous material such as cotton (i.e. currency paper), and composite materials such as natural or synthetic fibers set in a transparent or translucent thermoplastic or resin. Accordingly, the features 236 may include fibrous material used to form the package 132.

The indicium 228 is typically applied to the package 132 and represents data used to authenticate the packaged good 108. Thus, the indicium 228 may include information based on the features 236 of the fingerprint area 224. In one embodiment, the indicium 228 is printed on the extension flap 172 or another part of the package 132 with the printer 124. In another embodiment, the indicium 228 is printed on an adhesive label or sticker and is permanently applied to the package 132. A label that is permanently applied to the package 132 cannot be removed from the package 132 without destroying at least one of the label and the package 132. The indicium 228 is applied to any exterior surface of the package 132; however, it is typically desirable to apply the indicium 228 in a location that simplifies authenticating the packaged good 108, such as in a location that is easily imaged by the imaging device 120.

In one embodiment, the indicium 228 is a machine readable optical code, such as a one-dimensional barcode or a two-dimensional barcode (i.e. matrix barcode or QR code) that is representative of identity data of the packaged good 108, location data of the fingerprint area 224 on the package 132, and signature data. In other embodiments, the indicium 228 represents only the identity data and the signature data. Each of the identity data, the location data, and the signature data are described below.

The identity data includes data configured to uniquely identify and distinguish the packaged good 108 from every other packaged good 108. The identity data is based on the features 236 of the fingerprint area 224. The controller 128 processes image data of the features 236 to generate the identity data. The identity data is unique to the package 132 because the features 236 are unique to the package 132.

The indicium 228 includes the location data because in some embodiments the fingerprint area 224 is not identified with human readable markings and/or a machine (not shown) is configured to locate the fingerprint area 224. For example, the indicium 228, in some embodiments, includes data that is interpreted by the controller 128 to indicate the shape and size of the fingerprint area 224 as well as the location of the fingerprint area 224 relative to the indicium 228 or another reference point of the package 132. In one embodiment, the package 132 includes printer registration marks or other reference points printed thereon and the location of the fingerprint area 224 is provided in relation to the registration marks. In another embodiment, the indicium 228 includes a QR code that provides the location of the fingerprint area 224 relative to a particular position marker symbol 252 of the QR code. Moreover, the location of the fingerprint area 224, in some embodiments, is provided in relation to a corner of the package 132 or a logo printed on the package 132.

The signature data is generated by the controller 128 using a digital security key, according to known cryptographic principles. Typically, the signature data can be generated only by the entity that seals the product 136 within the package 132.

The indicium 228 is provided as either a static indicium or a dynamic indicium. A static indicium 228 or a static QR code, includes the identity data, the location data, and the signature data. A dynamic indicium 228 includes data associated with a pointer, such as a uniform resource locator ("URL"), to a remote computer on which the identity data, the location data, and the signature data are stored. Moreover, in some embodiments, the packaged good 108 includes three indicia, a separate indicium for each of the identity data, the location data, and the signature data.

As shown in FIG. 2, the product 108 is provided as any desired product that is sized for placement within the storage section 168 of the package 132. Exemplary products 108 include pharmaceuticals, food products, electronic devices and media, clothing, collectible items, tobacco products, and the like. In some embodiments, packaging material and/or cushioning material is also placed in the storage space 176 to support and to protect the product 108.

Figure 5:
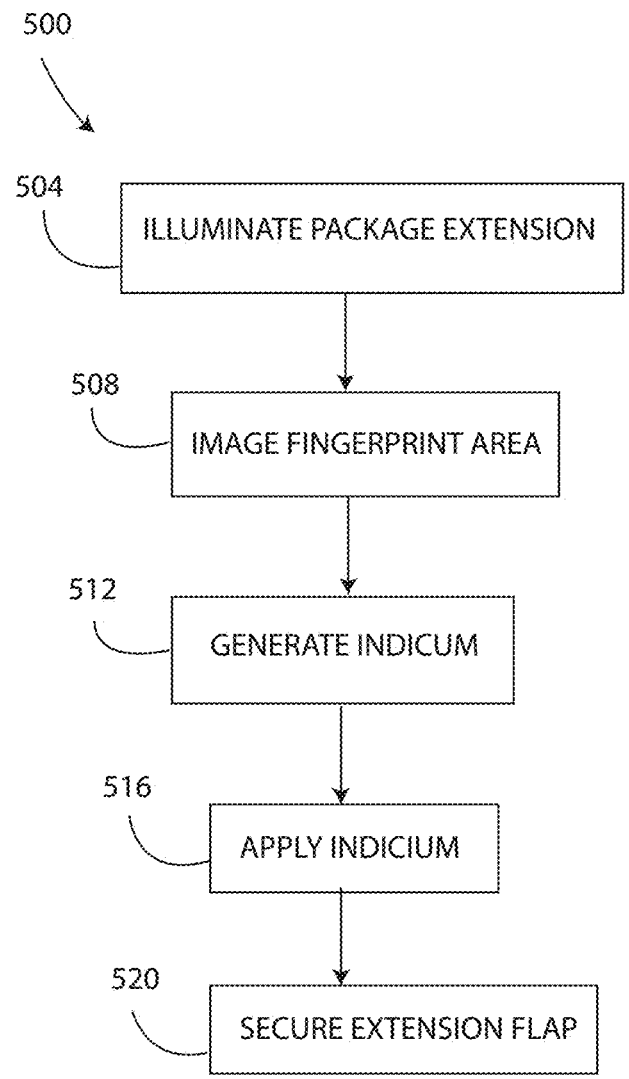
FIG. 5 is a flowchart depicting a method of assigning an identity to the packaged good of FIG. 2.

The flowchart of FIG. 5 illustrates a method 500 for using the authentication apparatus 104 to assign an identity to the packaged good 108 and to electronically sign the packaged good 108. To begin, the product 136 is positioned within the storage space 176 and then the storage section 168 is permanently sealed closed. Next, the extension flap 172 is moved to the extended position (FIG. 2), and the extension flap 172 is placed on the upper platform 144 of the support structure 112.

In block 504, the light source 116 is activated to emit light in the emitted light direction 156 through the transparent upper platform 144 and directly against an underside of the extension flap 172, which is also referred to herein as an illumination side of the fingerprint area 224 and of the extension flap 172. Accordingly, the light source 116 directly illuminates the illumination side of the fingerprint area 224. The controller 128 is used to achieve a desired intensity of light emitted by the light source 116. The package 132 is configured such that the illumination side of the fingerprint area 224 is illuminated without any storage space panels of the package 132 blocking the light from the light source 116. That is, none of the storage space panels of the package 132, including the top surface 184, the bottom surface 188, the side surfaces 192, 196, and the tabs 204, 208, 212, 216 are located in the light path 156.

As shown in block 508, next the imaging device 120 is used to image an imaging side of the illuminated fingerprint area 224. The imaging side of the fingerprint area 224 is located opposite of the illumination side of the fingerprint area 224. That is, the imaging side is the side of the fingerprint panel 188 that is opposite from the side of the fingerprint panel 188 that includes the illumination side. When the fingerprint area 224 is illuminated by the light source 116 the features 236 in the fingerprint area 224 are easily identifiable by the imaging device 120, because the light illuminating the fingerprint area 224 is emitted directly onto the underside of the fingerprint area 224 without being scattered by another portion of the package 132. Thus, the extension flap 172 enables the fingerprint area 224 to be easily imaged. During imaging and illumination of the fingerprint area 224, the fingerprint area 224 is located between the imaging device 120 and the light source 116.

Additionally, the extension flap 172 enables the fingerprint area 224 to be accurately imaged because the fingerprint area 224 is illuminated directly with light that is free from artifacts or other irregularities. In particular, none of the storage space panels of the package 132 are located in the imaging path 160. In contrast, the package 26 of FIG. 1 is susceptible to artifacts because the lower surface 46 (i.e. lower panel) of the package 26 may include irregularities that cast a shadow (i.e. an artifact) on the upper surface 50 of the package 26 that contains the fingerprint area 42. Thus, in the prior art the fingerprint area 42 is only indirectly illuminated. These artifacts reduce the accuracy of the image taken by the imaging device 34 by preventing the features (not shown) of the fingerprint area 42 from being sufficiently illuminated. Moreover, the extension flap 172, which is completely spaced apart from the product 136, prevents the product 136 from blocking any of the light emitted by the light source 116 onto the fingerprint area 224.

In block 512, after the fingerprint area 224 has been imaged, the controller 128 generates the indicium 228. Generating the indicium 228 includes processing the image data of the fingerprint area 224 to generate the identity data, the fingerprint location data, and the signature data.

With reference to block 516, the generated indicium 228 is applied or associated with the package 132. The printer 124 prints the indicium 228 in a predetermined location 240 (FIG. 3) of the package 132 taking into account the fingerprint location data. For example, as shown in FIG. 3, in one embodiment, the predetermined location 240 is selected based on an X-distance 244 and a Y-distance 248 of a center point 242 of the fingerprint area 224 from a position marker symbol 252 of the indicium 228. In an embodiment of the package 132 including the human-readable border 232, the indicium 228 is printed or positioned in any convenient location of the package 132. Typically, the indicium 228 and the fingerprint area 224 are on the same surface of package 132.

Next, in block 520 the packaged good 108 is removed from the support structure 112 and the extension flap 172 is secured in the retracted position. Securing the extension flap 172 in the retracted position is optional, but simplifies transport and packaging of the packaged good 108. The extension flap 172, in some embodiments, includes an area 256 (FIG. 4) for receiving an adhesive in order to secure the extension flap 172, which is pivotably connected to the tab 212 (i.e. a storage space panel), in the retracted position. The area 256 is spaced apart from the fingerprint area 232 and the indicium 228 so that the adhesive is prevented from interfering with the authentication process.

Figure 6:
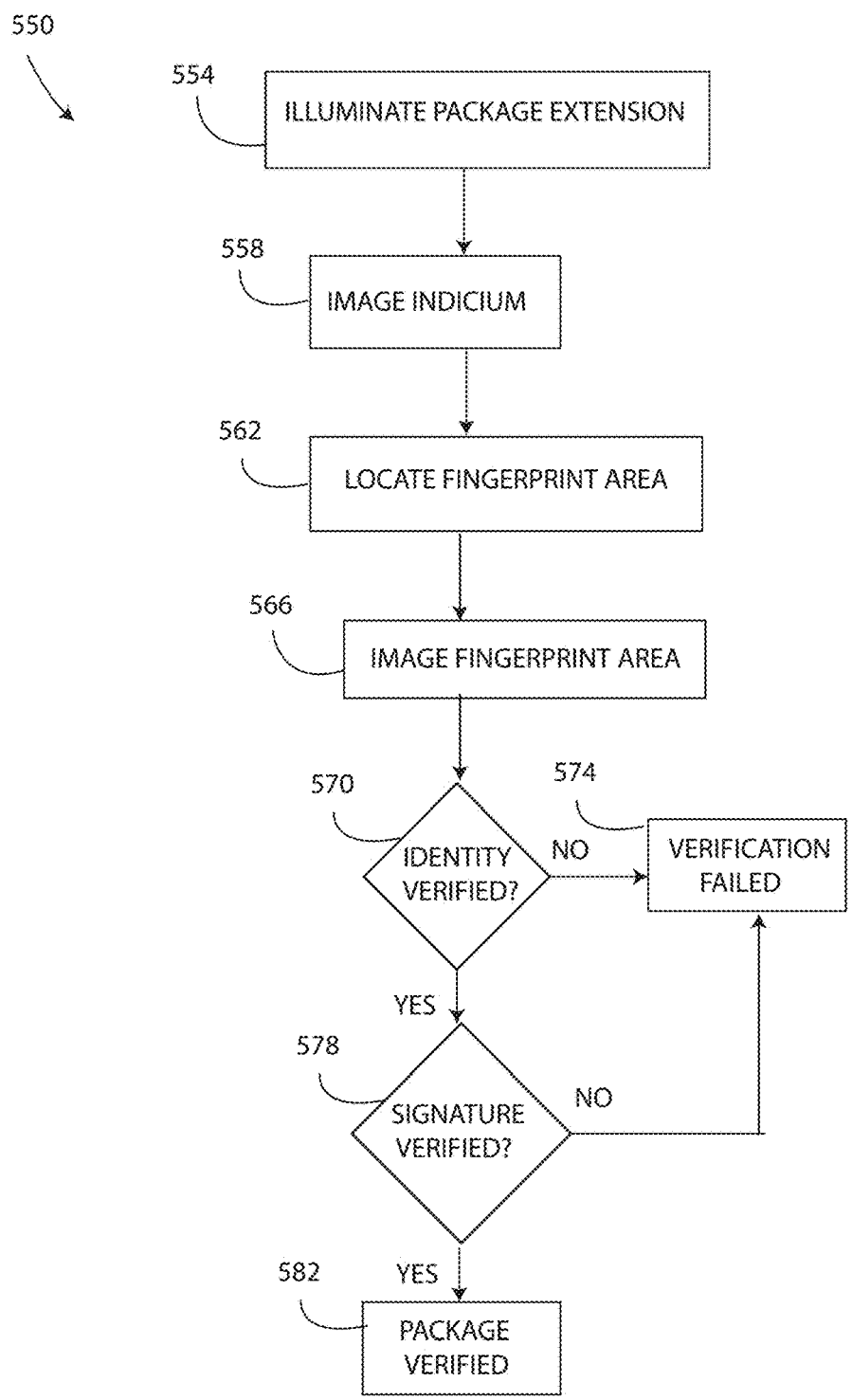
FIG. 6 is a flowchart depicting a method of verifying the identity assigned to the packaged good of FIG. 2.

The flowchart of FIG. 6, illustrates a method 550 for using the authentication apparatus 104 to verify the identity of the packaged good 108. To begin, the extension flap 172 is moved from the retracted position (FIG. 3) to the extended position (FIG. 2), and the extension flap 172 is placed on the upper platform 144 of the support structure 112. The upper platform 144 supports the extension flap 172 in a desired position for being imaged by the imaging device 120 and being illuminated by the light source 116. The extension flap 172 is repeatedly movable to the extended position for repeated verification of the packaged good 108 without opening or unsealing the storage section 168.

Then, in block 554, the light source 116 is activated to emit light in the emitted light direction 156 through the transparent upper platform 144 and directly against an underside of the extension flap 172 (i.e. the illumination side of the fingerprint area 224). The controller 128 achieves a desired intensity of light emitted by the light source 116.

In block 558, the imaging device 224 is used to image the indicium 228 and to generate image data corresponding to the indicium 228. The controller 128 processes the image data corresponding to the indicium 228 to determine the identity data, the location data, and the signature data, each of which is typically stored in the memory 164.

With reference to block 562, next the location of the fingerprint area 224 on the package 132 is determined and the fingerprint area 224 is moved to a position suitable for being imaged by the imaging device 120, if necessary. In some embodiments, the fingerprint area 224 and the indicium 228 both fit in the field of view of the imaging device 120 and movement of the extension flap 172 or package 132 is not needed. Moreover, in some embodiments, the fingerprint area 224 and the indicium 228 are imaged simultaneously. Then, in block 566, the imaging device 120 is used to image the fingerprint area 224 and to generate fingerprint image data associated with the fingerprint area.

As described in block 570, next the identity of the packaged good 108 is verified using the controller 128. In particular, the controller 128 processes the fingerprint image data in an attempt to locate data that corresponds to the identity data of the indicium 228. If the controller 128 locates data that corresponds to the identity data of the indicium 228, then the fingerprint area 224 includes the same features 236 as the features 236 that were used to generate the indicium 228, and the controller 128 determines that the identity of the package 132 matches the identity provided by the indicium 228. If the fingerprint image data fails to include data that corresponds to the identity data of the indicium 228, then the verification of the packaged good 108 fails (block 574), and the controller 128 determines that the package 132 is not the package the indicium 228 purports it to be.

Next, in block 578 if the controller 128 verifies the identify data, then the controller 128 verifies the signature data to determine if the signature is authentic. Known cryptographic techniques are used to verify the integrity of the signature. Exemplary techniques include public key techniques and symmetric key techniques. In public key cryptography, two keys are utilized including a public key and a secret key (i.e. a private key). The secret key, which is typically known to only the owner, enables the owner to create an authentic signature. The public key, which may be known to everyone, may be used to verify the signature generated with the secret key. In symmetric key cryptography, a secret key is shared with the party that wants to verify the signature. First, the owner of the secret key generates a "tag" with the shared secret key. Then the verifying party uses the shared secret key to verify that the tag was generated with the same secret key. This method may be referred to as message authentication code ("MAC"). In addition to the above described examples, the controller 128 may use any other method to verify the signature. If the signature can be verified, then the controller 128 determines that the packaged good 108 is an authentic packaged good, as described in block 582. In block 574, if the controller 128 cannot verify the signature, then even if the features 236 are present in the fingerprint area 232 (i.e. the identity is verified), the packaged good is determined to be non-authentic.

The support structure 112 is useful for supporting the packaged good 108 during the methods 500, 550; however, both methods 500, 550 are executable without the support structure 112. To perform the methods 550, 550 without the support structure 112, the extension flap 172 is maintained in desired position between the imaging device 120 and the light source 116 with another type of support member (not shown) or manually by the user.

According to another method of using the authentication apparatus 104, a third party manufactures the package 132, generates the indicium 228, and applies the indicium 228 to the package 132. In such an embodiment, the indicium 228 includes data associated with a pointer to a remote computer. Then, the package 132 is provided to an entity (i.e. a "packaging entity") that desires to package the product 136. Either before or after the product 136 is sealed within the package 132, the packaging entity scans the indicium 228 and generates the signature data which is then stored on the remote computer. The package 132 is then verified according to the method 550 of FIG. 6.

In yet another embodiment of the disclosure, at least two of the packaged good 108 are sealed within an outer package (not shown). In this "recursive" embodiment, the outer package contains a signature, which not only uses as an input the fingerprint of the outer package, but also an ID or signature corresponding to each packaged good 108 inside the outer package. In this embodiment, full verification can be performed only after opening the outer package. For example, a hash of all the IDs or signatures sealed within the outer package may be contained in a QR code printed on the outer package. After opening the outer package the user then verifies that the IDs or signatures of the packaged goods 108 within the outer package hash together to result in the hash printed on the outer package. Such an embodiment may be useful for verification of crates (i.e. corresponding to the outer package) containing many individual packages (i.e. corresponding to the packaged goods 108).

Figure 7:
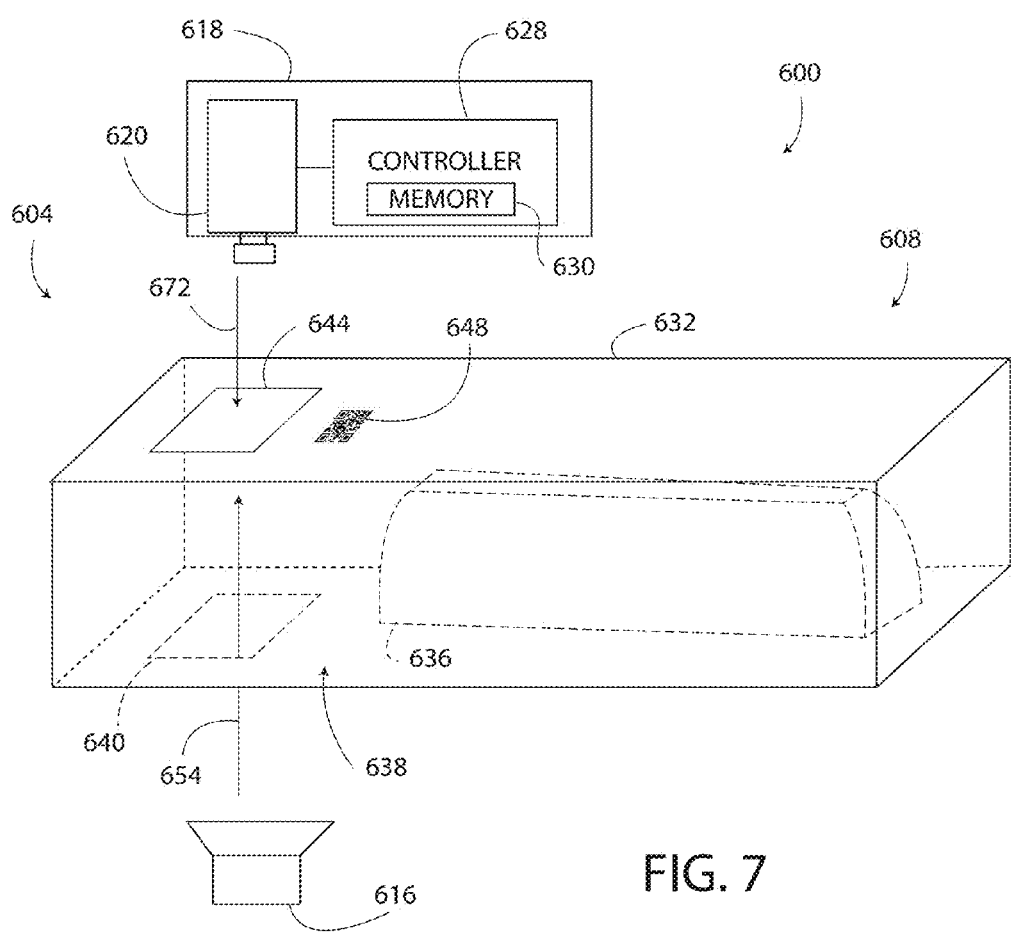
FIG. 7 is another embodiment of a system, as disclosed herein, including a packaged good having a package that includes a window (shown in broken lines) through which light from a light source is configured to pass onto a fingerprint area, a product sealed within the package and hidden edges of the package are also illustrated in broken lines.

As shown in FIG. 7, another embodiment of a system 600 includes an authentication apparatus 604 and a packaged good 608. The authentication apparatus 604 includes a light source 616 and a smartphone 618 or another standalone device that includes an imaging device 620 and a controller 628 with memory 630. The light source 616 is substantially identical to the light source 116, the imaging device 620 is substantially identical to the imaging device 120, and the controller 628 is substantially identical to the controller 128. Accordingly, the imaging device 620 defines an imaging path 672 that extends directly from the imaging device 620 to the imaging side of the fingerprint area 644.

The packaged good 608 includes a package 632 and a product 636 sealed therein. The authentication apparatus 604 is used to assign an identity to the packaged good 608 as well as to verify the identity of the packaged good 608 according to the methods 500, 550 described above.

The package 632 includes a storage space 638, a window 640, a fingerprint area 644, and an indicium 648. The storage space 638 is a substantially rectangular cuboid volume in which the product 636 is positioned. In FIG. 7, the storage space 638 is shown in a sealed configuration configured to prevent the product 636 from being removed from the storage space 638 without destroying at least a portion of the storage space 638, such as by tearing or cutting.

Figure 8:
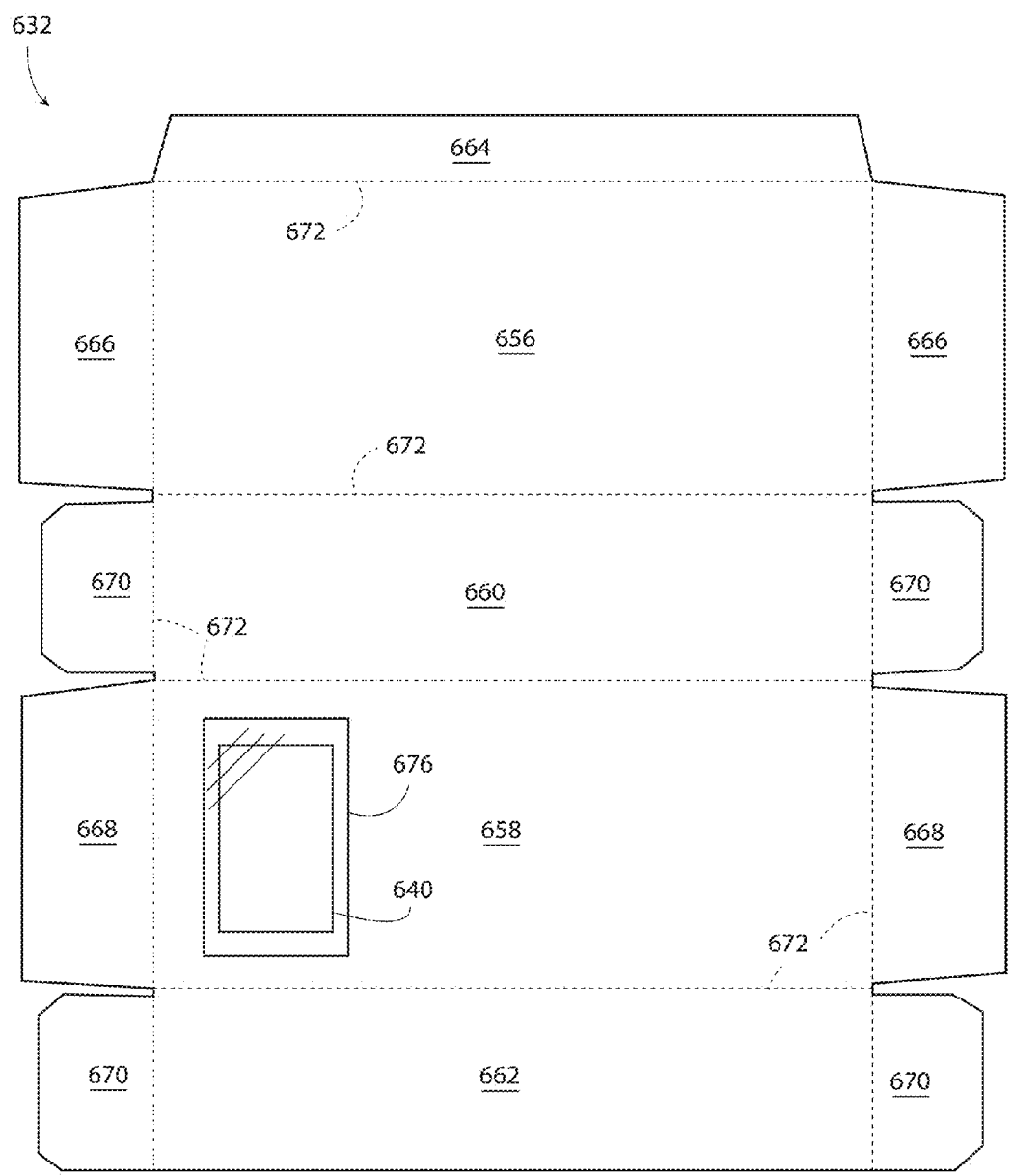
FIG. 8 is a top plan view of the package of FIG. 7 in an unassembled configuration, a transparent material is shown covering the window and fold lines of the package are shown in broken lines.

FIG. 8 illustrates the package 632 in an unassembled state. The package 632 includes a top surface 656, a bottom surface 658, a first side surface 660, and a second side surface 662. The package 632 also includes a longitudinal tab 664, two top tabs 666, two bottom tabs 668, and four side tabs 670. The top surface 656, the bottom surface 658, the side surfaces 660, 662, and the tabs 664, 666, 668, 670 are also referred to herein as panels. The top surface 656 is referred to as a fingerprint panel because the top surface 656 includes the fingerprint area 644. The panels of the package 632 that do not contain the fingerprint area 644 are not considered to be fingerprint panels. Thus, in the embodiment of FIG. 8, the bottom surface 658, the side surfaces 660, 662, and the tabs 664, 666, 668, 670 are not fingerprint panels. The package 632 is bent along bend lines 672 to form the storage space 638. The tabs 664, 666, 668, 670 are bent and at least some of the tabs 664, 666, 668, 670 are sealed together to seal the product 636 within the storage space 638. In the embodiment of FIG. 7, the fingerprint panel (i.e. top surface 656) defines the storage space 638.

The fingerprint area 644 and the indicium 648 are substantially identical to the fingerprint area 224 and the indicium 228 of the package 132 shown in FIG. 3. Accordingly, at least the fingerprint area 644 of the fingerprint panel 656 is configured for a diffuse transmission of light.

The window 640 is an opening through the bottom surface 658 of the package 632. The window 640 is covered with a transparent film 676 (FIG. 8) that is adhered to the bottom surface 658 from within the storage space 638 to prevent access to the storage space 638 from outside of the sealed package 632. The transparent film 676 is provided as Mylar, cellophane, or any other sufficiently transparent film. The window 640 defines a substantially rectangular shape in FIGS. 7 and 8; however, in other embodiments the window 640 has any desired shape. The size and shape of the window 640 are selected to correspond to the size and shape of the fingerprint area 644. Typically, the size and shape of the window 640 are selected to be substantially equal to or slightly larger than the size and shape of the fingerprint area 644 so that the window 640 passes enough light to directly illuminate the illumination side of the fingerprint area 644.

As shown in FIG. 7, the window 640 is located directly opposite of the illumination side of the fingerprint area 644. Accordingly, the window 640 is configured to enable light from the light source 616 to pass therethrough and to directly illuminate the illumination side (i.e. the underside) of the fingerprint area 644 so that the fingerprint area 644 can be effectively imaged by the imaging device 620 (i.e. the imaging side). That is, the light from the light source 616 defines a light path 654 directly from the light source 616 to the illumination side of the fingerprint area 644. None of the storage space panels of the package 632 are located in the light path 654. The light from the light source 616 directly illuminates the illumination side of the fingerprint area 644. Moreover, none of the storage space panels of the package 632 are located in the imaging path 672. The package 632 of FIG. 7 is an improvement over the prior art package 26 of FIG. 1 because the light from the light source 616 is not scattered or attenuated by another portion of the package (i.e. the lower surface 46) before illuminating the fingerprint area 644.

Figure 9:
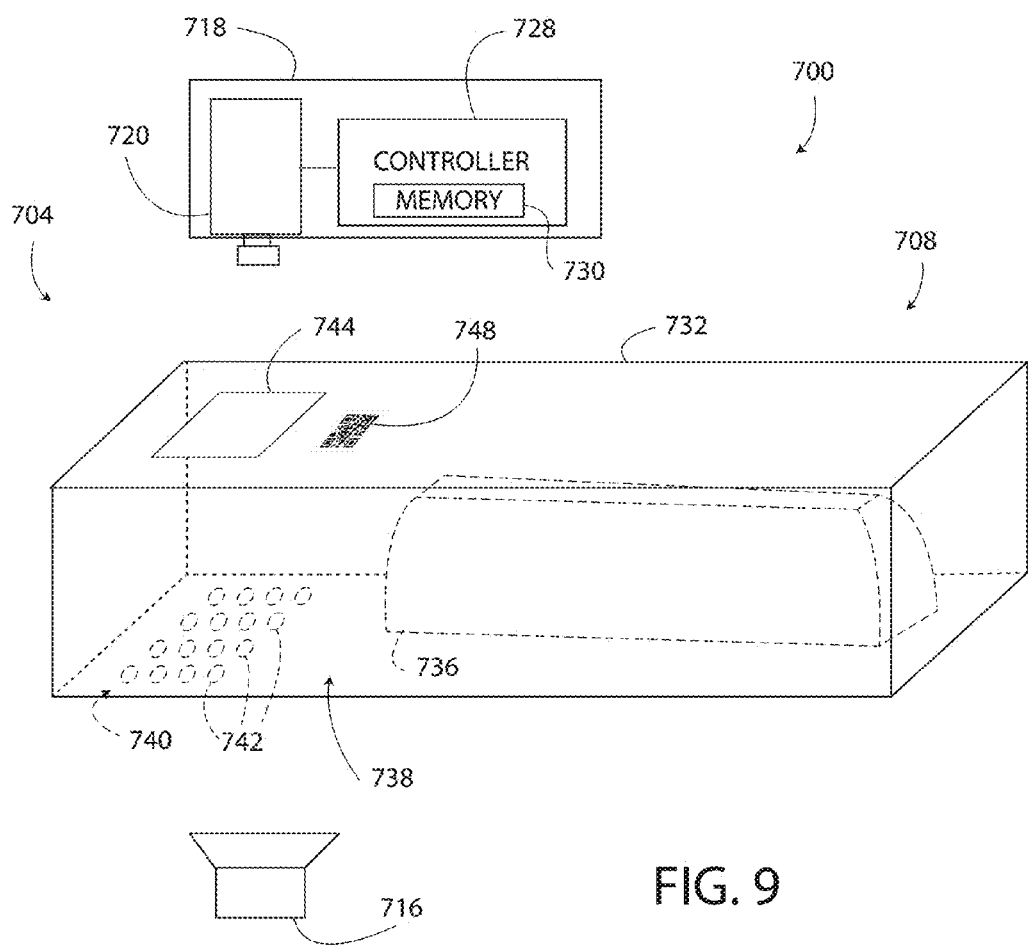
FIG. 9 is another embodiment of a system including a packaged good having a package that includes a plurality of windows (shown in broken lines) through which light from a light source is configured to pass onto a fingerprint area, a product sealed within the package and hidden edges of the package are also illustrated in broken lines.

As shown in FIG. 9, another embodiment of a system 700 includes an authentication apparatus 704 and a packaged good 708. The authentication apparatus 704 includes a light source 716 and a smartphone 718 or another standalone device that includes an imaging device 720, a controller 728, and a memory 730. The packaged good 708 includes a package 732 and a product 736 sealed therein. The authentication apparatus 704 is used to assign an identity to the packaged good 708 as well as to verify the identity of the packaged good 708 according to the methods 500, 550 described above.

The package 732 includes a storage space 738, a window 740, a fingerprint area 744, and an indicium 748. The storage space 738 is a substantially rectangular cuboid volume in which the product 736 is positioned. In FIG. 9, the storage space 738 is shown in a sealed configuration configured to prevent the product 736 from being removed from the storage space 738 without destroying at least a portion of the storage space 738, such as by tearing or cutting.

The fingerprint area 744 and the indicium 748 are substantially identical to the fingerprint area 224 and the indicium 228 of the package 132 shown in FIG. 3.

The window 740 includes a plurality of openings 742 through a bottom surface 758 of the package 732. The openings 742 are covered with a transparent film (not shown) that is adhered to the bottom surface 758 of the package 732 from within the storage space 738 to prevent access to the space 738 from outside of the sealed package 732. The transparent film is provided as Mylar, cellophane, or any other sufficiently transparent film. In another embodiment, the openings 740 are not covered with any type of film and are sized to prevent the product 736 from passing therethrough and to prevent tampering with the product 736.

In FIG. 9, the window 740 is located directly opposite of the fingerprint area 744. Accordingly, the openings 742 of the window 740 are configured to enable light from the light source 716 to pass therethrough and to directly illuminate the underside of the fingerprint area 744 so that the fingerprint area 744 can be effectively imaged by the imaging device 720. The package 732 of FIG. 9 is an improvement over the prior art package 26 of FIG. 1 because the light from the light source 716 is not scattered or attenuated by another portion of the package 732 (i.e. the lower surface 46) before illuminating the fingerprint area 744.

Figure 10:
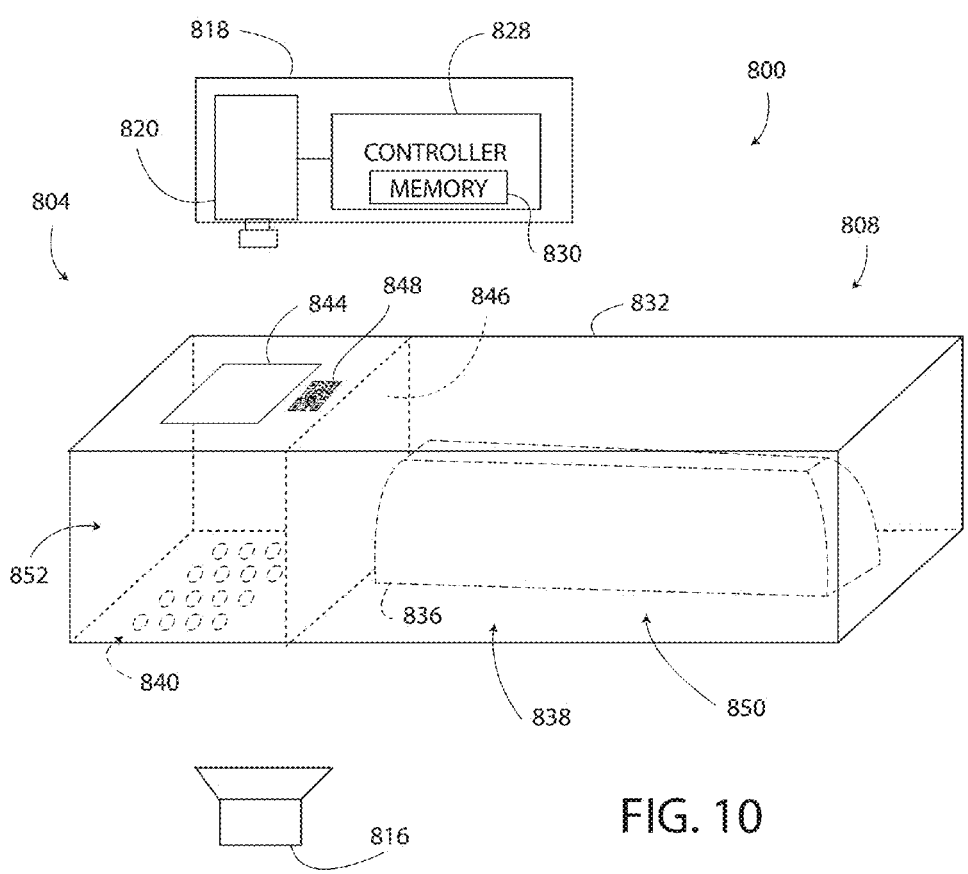
FIG. 10 is another embodiment of a system including a packaged good having a package that includes a plurality of windows (shown in broken lines) and a divider (shown in broken lines) configured to divide an interior space of the package into two isolated regions, a product sealed within the package and hidden edges of the package are also illustrated in broken lines.

As shown in FIG. 10, another embodiment of a system 800 includes an authentication apparatus 804 and a packaged good 808. The authentication apparatus 804 includes a light source 816 and a smartphone 818 or another standalone device that includes an imaging device 820 and a controller 828. The packaged good 808 includes a package 832 and a product 836 sealed therein. The authentication apparatus 804 is used to assign an identity to the packaged good 808 as well as to verify the identity of the packaged good 808 according to the methods 500, 550 described above.

The package 832 includes a storage space 838, a blocking member 846, a window 840, a fingerprint area 844, and an indicium 848. The storage space 838 is a substantially rectangular cuboid space that is divided into a product space 850 and a light transmitting space 852 by the blocking member 846. The product 836 is located in the product space 850, which is partially defined by the fingerprint panel. The blocking member 846 is located in a fixed position in the storage space 838 and is configured to prevent the product 836 from moving from the product space 850 to the light transmitting space 852. As illustrated, the blocking member 846 is imperforate; however, in some embodiments, the blocking member 846 includes perforations (not shown) that are smaller than any dimension of the product 836 so as to prevent the product 836 from passing through the blocking member 846 and into the light transmitting space 852.

The fingerprint area 844 and the indicium 848 are substantially identical to the fingerprint area 224 and the indicium 228 of the package 132 shown in FIG. 3. The illumination side of the fingerprint area 224 is located in the light transmitting space 852. The imaging side of the fingerprint area 224 is located outside of the light transmitting space 852 and outside of the product space 850.

In FIG. 10, the window 840, which is substantially identical to the window 740, is located directly opposite of the fingerprint area 844. Accordingly, the window 840 is configured to enable light from the light source 816 to pass therethrough, to enter the light transmitting space 852, and to directly illuminate the underside of the fingerprint area 844 so that the fingerprint area 844 can be effectively imaged by the imaging device 820. The package 832 of FIG. 10 is an improvement over the prior art package 26 of FIG. 1, because the light from the light source 816 is not scattered or attenuated by another portion of the package 832 before illuminating the fingerprint area 844. Moreover, the package 832 prevents the product 836 from moving to a position that could potentially block transmission of the light through the light transmitting space 852. As a result, the light from the light source 816 has a clear path through the package 832 independent of the orientation of the package 832 and the position of the product 836.

While the disclosure has been illustrated and described in detail in the drawings and foregoing description, the same should be considered as illustrative and not restrictive in character. It is understood that only the preferred embodiments have been presented and that all changes, modifications, and further applications that come within the spirit of the disclosure are desired to be protected.

What is claimed is:

1. A package comprising:
a fingerprint panel including a fingerprint area configured for a diffuse transmission of light, an illumination side of the fingerprint area configured to be directly illuminated with light from a light source, and an opposite imaging side of the fingerprint area configured to be directly imaged with an imaging device,
wherein the fingerprint area includes features that represent an identity of the package.

2. The package as claimed in claim 1, further comprising:
a plurality of storage space panels configured to define a storage space,
wherein the illumination side is configured to be illuminated without any storage space panels blocking the light from the light source.

3. The package as claimed in claim 1, further comprising:
a plurality of storage space panels configured to define a storage space,
wherein the light from the light source defines a light path from the light source to the illumination side of the fingerprint area, and
wherein none of the storage space panels are located in the light path.

4. The package as claimed in claim 3, wherein:
an imaging path extends from the imaging side of the fingerprint area to the imaging device, and
none of the storage space panels are located in the imaging path.

5. The package as claimed in claim 1, further comprising:
a plurality of storage space panels configured to define a storage space,
wherein the fingerprint panel does not define the storage space.

6. The package as claimed in claim 1, further comprising:
a plurality of storage space panels, the storage space panels and the fingerprint panel defining a storage space; and
a blocking member configured to divide the storage space into a light transmitting space and a product space for receiving a product, the blocking member preventing the product from moving from the product space to the light transmitting space.

7. The package as claimed in claim 6, wherein:
the illumination side is located in the light transmitting space, and
the imaging side is located outside of the light transmitting space and outside of the product space.

8. The package as claimed in claim 1, further comprising:
a plurality of storage space panels configured to define a storage space,
wherein at least one storage space panel defines at least one window opening positioned such that the light from the light source passes through the at least one window opening before directly illuminating the illumination side.

9. The package as claimed in claim 8, wherein the at least one window opening is located directly opposite from the illumination side.

10. The package as claimed in claim 1, further comprising:
a plurality of storage space panels configured to define a storage space; and
an indicium on at least one of the storage space panels and the fingerprint panel, the indicium including information based on the features.

11. A package, comprising:
a fingerprint panel including a fingerprint area configured for a diffuse transmission of light, an illumination side of the fingerprint area configured to be directly illuminated with light from a light source, and an opposite imaging side of the fingerprint area configured to be directly imaged with an imaging device,
wherein the fingerprint area includes features that represent an identity of the package, and
wherein the features include a fibrous material used to form the package.

12. A package authentication system comprising:
a package including a plurality of storage space panels and a fingerprint panel, the fingerprint panel including a fingerprint area configured for diffuse transmission of light and defining an illumination side and an opposite imaging side;
a light source configured to directly illuminate the illumination side; and
an imaging device configured to directly image the imaging side, the fingerprint area configured to be located between the imaging device and the light source during illumination of the illumination side and imaging of the imaging side,
wherein the fingerprint area includes features that represent an identity of the package.

13. The package authentication system as claimed in claim 12, wherein the illumination side is configured to be illuminated without any of the storage space panels blocking light from the light source.

14. The package authentication system as claimed in claim 12, wherein:
the light from the light source defines a light path from the light source to the illumination side, and
none of the storage space panels are located in the light path.

15. The package authentication system as claimed in claim 14, wherein:
   an imaging path extends from the imaging side to the imaging device, and
   none of the storage space panels are located in the imaging path.

16. The package authentication system as claimed in claim 12, wherein:
   the plurality of storage space panels defines a product space for receiving a product,
   the fingerprint panel does not define the product space, and
   the fingerprint panel is pivotably connected to one of the storage space panels.

17. The package authentication system as claimed in claim 12, wherein the plurality of storage space panels and the fingerprint panel define an interior space and the package further comprises:
   a blocking member configured to divide the interior space into a light transmitting space and a product space for receiving a product, the blocking member preventing the product from moving from the product space to the light transmitting space.

18. The package authentication system as claimed in claim 17, wherein:
   the illumination side is located in the light transmitting space, and
   the imaging side is located outside of the light transmitting space and outside of the product space.

19. The package authentication system as claimed in claim 12, wherein the package further comprises:
   at least one window opening formed in a storage space panel and positioned such that the light from the light source passes through the at least one window opening before directly illuminating the illumination side.

20. The package authentication system as claimed in claim 19, wherein the at least one window opening is located directly opposite from the illumination side.

* * * * *